Jan. 6, 1959 W. A. HARTMANN, JR 2,867,761
MOTOR CONTROL SYSTEM
Filed Nov. 29, 1955
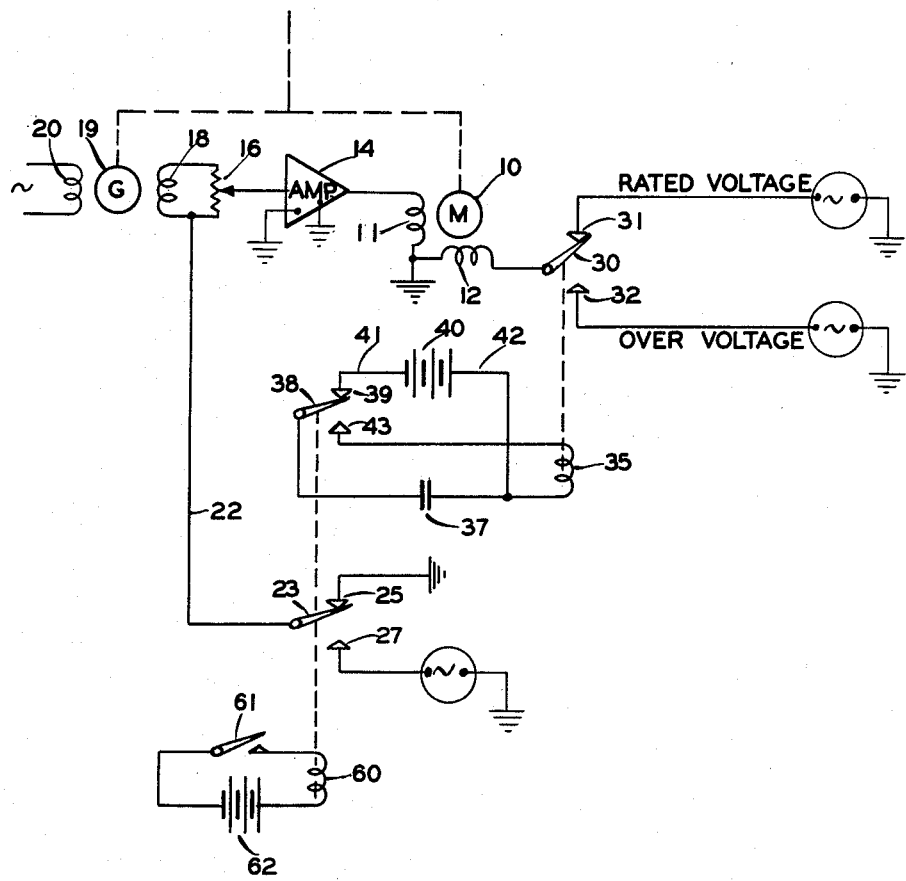
INVENTOR
WILLIAM ALFRED HARTMANN JR
BY
Oscar B Brumback
ATTORNEY

United States Patent Office 2,867,761
Patented Jan. 6, 1959

2,867,761

MOTOR CONTROL SYSTEM

William A. Hartmann, Jr., Pacific Palisades, Calif., assignor to Bendix Aviation Corporation, Teterboro, N. J., a corporation of Delaware Application November 29, 1955, Serial No. 549,604

4 Claims. (Cl. 318—230)

This invention relates generally to motor control systems.

A motor at rest tends to remain at rest and a motor in movement tends to remain in movement. Due to this inertia, a greater quantity of energy is required to place a motor in motion or to change its rate of motion than is required thereafter to maintain the motor in motion.

An object of the present invention, therefore, is to provide a motor with a novel provision for initially supplying the motor with a greater quantity of energy to place the motor into operation than is supplied to the motor after it is operating.

Another object is to provide a motor with a novel provision for supplying an over voltage to the motor for a predetermined length of time and automatically removing the over voltage from the motor thereafter, whereby the motor is accelerated from a rest position to its proper speed at a greater rate than when normal voltage only is applied to the motor.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description, and is not to be construed as defining the limits of the invention.

The single figure of the drawing illustrates schematically a novel motor control system in accordance with the present invention.

A conventional induction motor 10 is shown in the drawing as having two field windings 11 and 12. Variable phase control field winding 11 is energized by the output of a conventional phase discriminator amplifier 14 whose input circuit includes a potentiometer 16 connected across one winding 18 of a conventional rate generator 19 whose other winding 20 is continuously energized and whose rotor is driven by motor 10. Potentiometer 16 is connected by lead 22 to an armature 23 which selectively engages either a contact 25, which is grounded, or a contact 27, which is connected to a suitable source of alternating current. Fixed phase field winding 12 is energized by way of an armature 30 which selectively engages with a contact 31, which is energized from a rated voltage source of alternating current, and a contact 32 which is energized from an over voltage source of alternating current.

Armature 30 is disengaged from contact 31 and engaged with contact 32 upon the energization of a winding 35 of a solenoid operated relay. One end of the winding 35 is connected through a capacitor 37, armature 38, contact 39 and lead 41 to a suitable direct current input source such as a battery 40 which is also connected to armature 38 by way of lead 42. The other end of the solenoid is connected to contact 43. Thus, as long as armature 38 engages contact 39, solenoid 35 is not energized. However, upon the initial engagement of armature 38 and contact 43, capacitor 37 discharges through the winding 35 of the solenoid. The winding 35 of the solenoid is energized during this discharge period, which is determined by the R-C constants of the circuit, thereby pulling armature 30 downwardly into engagement with contact 32. Armatures 38, as well as armatures 23, are disengaged from respective contacts 39 and 25 by way of a solenoid operated relay 60 which is energized by the closing of switch 61.

Upon the closing of switch 61 to place the novel motor control system of the present invention into operation, solenoid 60 is energized from battery 62 and disengages armature 23 from contact 25 and engages the armature with contact 27, which is energized from a suitable source of alternating current. The alternating current supplied to amplifier 14 energizes variable phase winding 11 to start motor 10 to operate.

The initial operation of the motor must overcome the static friction and inertia of the system before it can start or reach its normal motor speed. Therefore, the energization of delay 60 also disengages armature 38 from contact 39 and engages the armature with contact 43 to discharge capacitor 37 through solenoid 35. This energizes the solenoid which disengages armature 30 from contact 31 and engages the armature with contact 32 to supply a large over voltage to the fixed phase winding 12 for an interval of time determined by the R-C constant of capacitor 37 and winding 35. Due to this large over voltage, the motor rapidly assumes its normal operating speed. After capacitor 37 discharges, relay 35 is deenergized and armature 30 again engages contact 31 to provide normal rated voltage to the fixed phase winding 12 of motor 10.

The opening of switch 61 deenergizes solenoid 60 and armature 23 again engages grounded contact 25. The inertia of motor 10, however, tends to keep the rotor of motor 10 revolving. Rate generator 19 in response to the motor operation develops a signal tending to operate the motor in the opposite direction and, thus, provides dynamic braking to bring motor 10 to a stop.

The engagement of armature 38 with contact 39 energizes capacitor 37 without further effect on solenoid 35.

The foregoing has presented a novel motor control system for supplying a substantial over voltage to a motor for a predetermined interval of time so that the motor overcomes the effects of inertia and static friction and rapidly accelerates to its normal speed. Thereafter the normal voltage supplied to the motor maintains this rate of speed.

Although but one embodiment of the invention has been illustrated and described, various changes can be made in the design and arrangement of the parts without departing from the spirit and scope of the invention as the same will now be understood by those skilled in the art.

I claim:

1. A control system comprising a motor having a fixed phase winding and a variable phase winding, and means for energizing said fixed and variable phase windings of said motor including a normal voltage source, an over voltage source, and a command voltage source, control means operable for connecting said command voltage source and said variable excitation phase winding, means for timing the energization of said fixed phase winding, means to render said timing means effective upon operation of said control means, selective means operated by said timing means for connecting said fixed phase winding and said over voltage source for a predetermined length of time, and said selective means thereafter operated by said timing means to disconnect said over voltage source and connect said fixed phase winding to said normal voltage source.

2. A control system comprising a motor having a fixed phase winding and a variable phase winding, means for energizing said windings including a normal voltage source, an over voltage source, and a command voltage source, control means operable in a first sense for connecting said variable phase winding and said command voltage source, means for timing the energization of said fixed phase winding, means to selectively effect operation of said timing means, said selective means operatively connected to said control means so that upon operation of said control means in said first sense said timing means may be rendered effective, other selective means operated by said timing means for connecting said fixed phase winding and said over voltage source for a predetermined interval of time, and said timing means thereafter effective to cause said other selective means to disconnect said over voltage source and connect said fixed phase winding and said normal voltage source, said timing means including a capacitor, a resistance discharge network for determining said predetermined interval, and a charging network for said capacitor rendered effective by said first-mentioned selective means upon operation of said control means in a second sense.

3. A control system comprising a motor having a fixed phase winding and a variable phase winding, means for energizing said windings including normal, over voltage and command voltage sources, control means operable in a first sense for connecting said variable phase winding and said command voltage source, means for timing energization of said fixed phase winding, means operatively connecting said timing means to said control means so that operation of said timing means may be initiated upon operation of said control means in said first sense, selective means operated by said timing means for connecting said fixed phase winding and said over voltage source for a predetermined interval of time, and said selective means thereafter operated by said timing means to disconnect said over voltage source and connect said fixed phase winding and said normal voltage source.

4. A motor control system comprising a motor having a control field winding and a fixed phase field winding, means for energizing said windings including a normal voltage source, an over voltage source and a command voltage source, selective means for connecting and disconnecting said control field winding and said command voltage source, said fixed phase winding normally being connected to said normal voltage source, a capacitor, means including a switch operable in one sense for charging said capacitor, a relay, means including said switch operable in a second sense for discharging said capacitor through said relay to energize the latter, means operatively connecting said switch to said selective means to render said switch operative in said second sense when said selective means is actuated to connect said control winding and said command voltage source, whereby said relay is energized by said means for discharging said capacitor, and switch means operable upon the energization of said relay for connecting said fixed phase field winding and said over voltage source, whereby said fixed phase field winding is connected to said over voltage source during a predetermined period of discharge of said capacitor and is reconnected by said switch means to said normal voltage source upon cessation of the energization of said relay by said capacitor discharge.

References Cited in the file of this patent

UNITED STATES PATENTS

| 531,432 | Bell | Dec. 25, 1894 |
| 2,193,634 | Lukens | Mar. 12, 1940 |
| 2,347,194 | Holliday | Apr. 25, 1944 |

OTHER REFERENCES

Publication—Automatic Feedback Control, by Ahrendt and Taflin, McGraw-Hill Co., 1951, pages 240–241.